United States Patent [19]

Lawless

[11] Patent Number: 5,014,557

[45] Date of Patent: May 14, 1991

[54] COMPOSITE BASE FOR A PRESSURE TRANSDUCER

[75] Inventor: Daniel F. Lawless, Hazel Green, Ala.

[73] Assignee: Acustar, Inc., Troy, Mich.

[21] Appl. No.: 534,580

[22] Filed: Jun. 6, 1990

[51] Int. Cl.$^5$ .............................................. G01L 7/00
[52] U.S. Cl. ............................................ 73/756; 73/431
[58] Field of Search ................. 73/756, 431, 706, 707, 73/708, 115, 719, 720, 721, DIG. 4, 725, 726, 727, 182, 754; 338/4, 42; 361/283; 310/338

[56] References Cited

U.S. PATENT DOCUMENTS

| 4,151,578 | 4/1979 | Bell | 361/283 |
|---|---|---|---|
| 4,177,496 | 12/1979 | Bell et al. | 361/283 |
| 4,207,604 | 6/1980 | Bell | 361/283 |
| 4,227,419 | 10/1980 | Park | 73/724 |
| 4,320,664 | 3/1982 | Rahn | 73/708 |
| 4,513,623 | 4/1985 | Kurtz et al. | 73/721 |
| 4,567,395 | 1/1986 | Pundarika | 310/338 |
| 4,570,097 | 2/1986 | Shukla et al. | 310/338 |
| 4,590,400 | 5/1986 | Shukla et al. | 310/338 |
| 4,616,114 | 10/1986 | Strasser | 200/835 |
| 4,620,438 | 11/1986 | Howng | 310/338 |
| 4,633,579 | 1/1987 | Strasser | 29/622 |
| 4,645,965 | 2/1987 | Paganelli | 310/338 |
| 4,866,989 | 9/1989 | Lawless | 73/756 |

Primary Examiner—Donald O. Woodiel
Attorney, Agent, or Firm—Kenneth H. MacLean, Jr.

[57] ABSTRACT

An oil pressure transducer with an improved composite base portion for mounting the transducer to a vehicle engine or the like to receive pressurized oil. The composite base has a skeletal component with a particularly effective configuration to permit sealing with an encircling molded elastomeric portion. In this manner, a highly leak resistant transducer base is produced having a metal portion for convenient threading into a threaded aperture of a vehicle engine and having an elastomeric portion adapted for ready attachment to a remaining portion of the transducer.

9 Claims, 2 Drawing Sheets

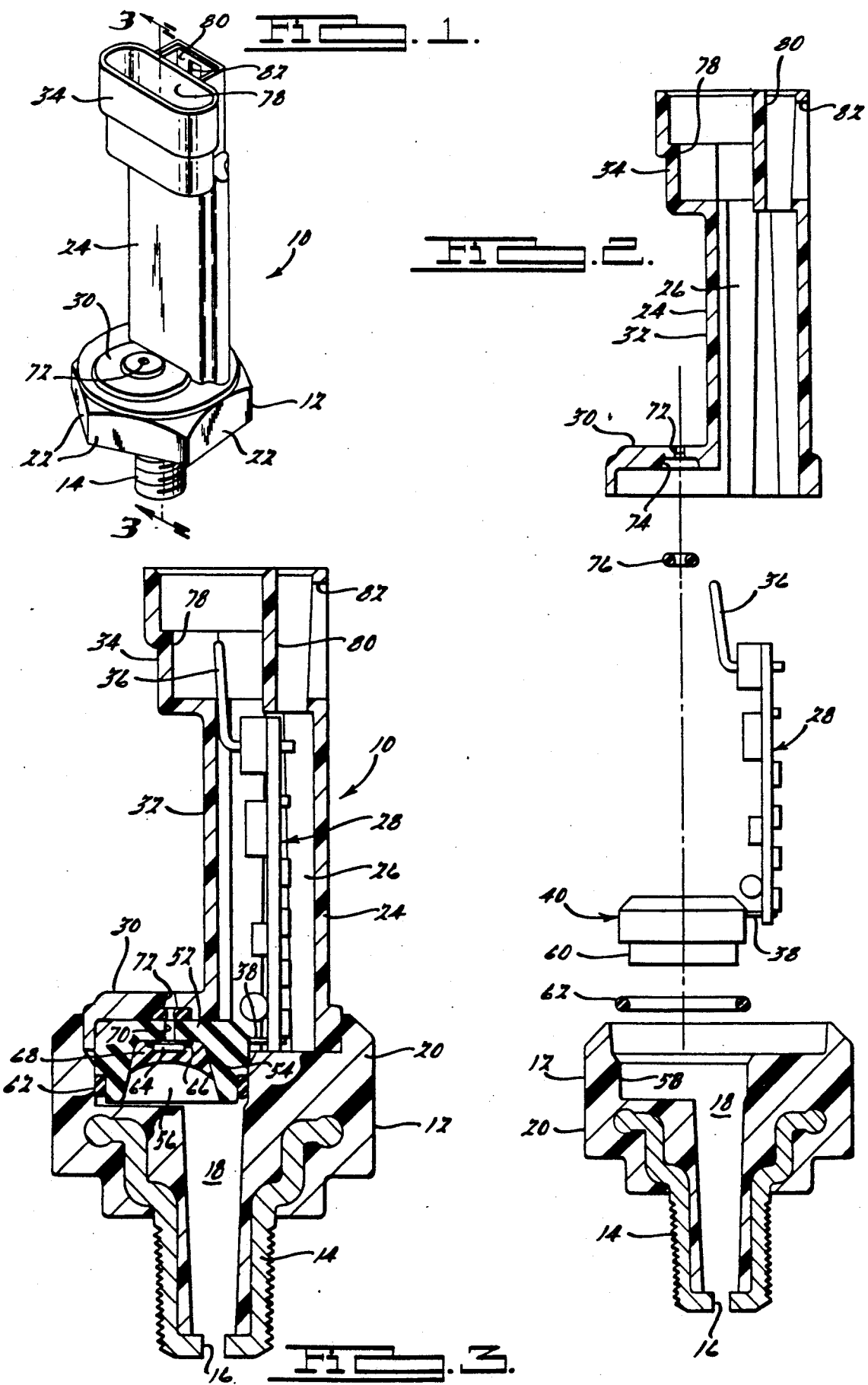

COMPOSITE BASE FOR A PRESSURE TRANSDUCER

BACKGROUND OF THE INVENTION

1. Field of the Invention

This application concerns a transducer for sensing engine oil pressure or the like and more particularly an improved composite base portion therefore with a metal and a plastic component.

2. Description of Related Art

There is a need for an accurate, durable, reliable and inexpensive pressure sensor or transducer. A particular use is such a transducer on a vehicle engine to sense lubricating oil pressure. Advances in electronics permit this technology to be used for this purpose. Particularly, small chips which sense pressure differentials are available. This application is an improvement over a previous application by the same applicant which related to a different aspect of the transducer. That application issued as U.S. Pat. No. 4,866,989 on Sept. 19, 1989.

In addition to the previously identified patent, a pressure transducer of this general type is disclosed in U.S. Pat. No. 4,513,628 to Kurtz. This patent shows a transducer using a sensor mounted in a housing. It does not show a similar composite base.

The following patents are identified as being generally relevant but not showing the subject composite base: U.S. Pat. Nos. 4,151,578; 4,158,217; 4,177,496; 4,207,604; 4,227,419; 4,320,664; 4,567,395; 4,570,097; 4,590,400; 4,616,114; 4,620,438 and 4,633,579.

SUMMARY OF THE INVENTION

This application describes an improved composite base for a pressure transducer The composite base includes a generally cup-shaped metal component with a plastic component hot molded thereabout.

The metal portion of the component has an open ended portion defined by an outwardly directed flange which produces a circumferential edge. The metal member also has a midportion which is irregularly configured by radially inwardly and outwardly directed features in the circumferential direction. When the plastic is hot molded about the metal edge and the irregular midportion, the plastic fills the midportion's irregularities to produce a strong mechanical connection with the metal component. This permits a significant torque load to be effectively transmitted between plastic and metal. Also, as the plastic cools, a significant contractive force is generated by the plastic in the radially inward direction against the edge. This produces a good seal between plastic and metal to prevent leakage of pressurized fluid therebetween.

Therefore, an object of this invention is to provide an improved composite base for a fluid transducer of metal and hot molded plastic which has a strong connection therebetween for transmittal of significant torque loads.

Another object of the invention is to provide an improved composite base for a fluid transducer of metal and hot molded plastic which is so configured to produce a good leak resistant seal therebetween as the hot plastic cools around an edge portion of the metal.

Still further objects and advantages of the subject improved composite base for a transducer will be more readily apparent after a reading of the following detailed description of a preferred embodiment, reference being had to the drawings which illustrate the embodiment.

IN THE DRAWING

FIG. 1 is a perspective view of the subject pressure transducer; and

FIG. 2 is a partially sectioned elevational and exploded view of the transducer's parts; and FIG. 3 is a sectioned elevational view of the assembled transducer showing details of the internal parts; and FIG. 4 is an enlarged sectional view of the improved composite base with a skeletal metal component and a molded elastomeric plastic component; and FIG. 5 is an enlarged elevational view of the composite's metal component prior to molding the elastomeric plastic component thereto; and FIG. 6 is a planar top view of the metal component and looking in Direction A in FIG. 5; and FIG. 7 is a sectioned elevational view of the metal component taken along section line 7—7 in FIG. 6 and looking in the direction of the arrows; and FIG. 8 is a sectional view of the metal component taken along section line 8—8 in FIG. 7 and looking in the direction of the arrows.

DETAILED DESCRIPTION OF A PREFERRED EMBODIMENT

Figure 4:
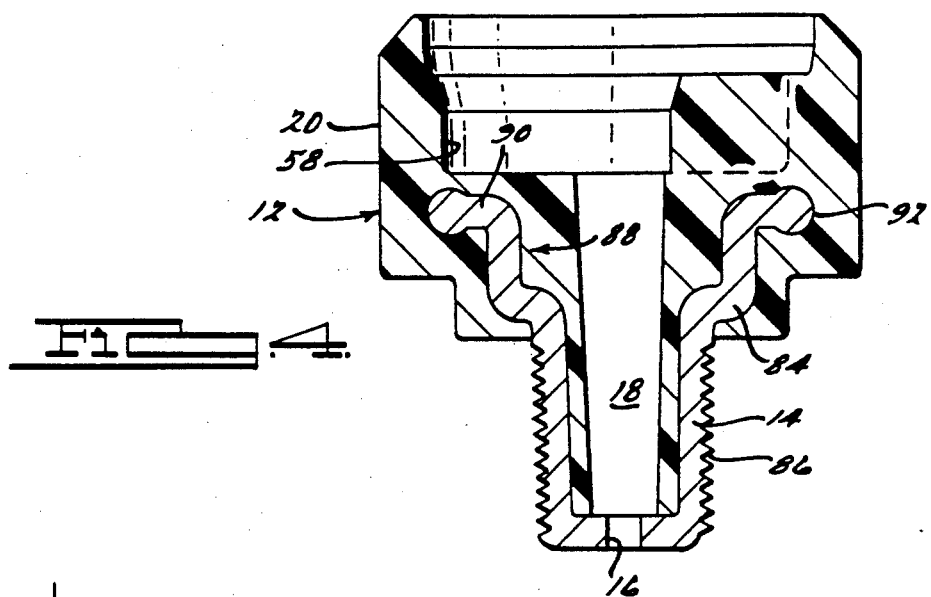
Figure 5:
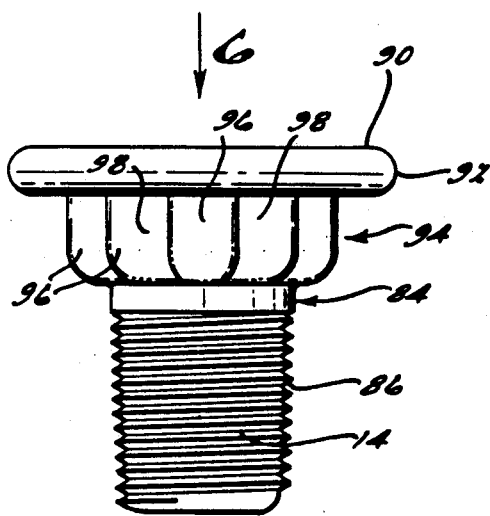
Figure 6:
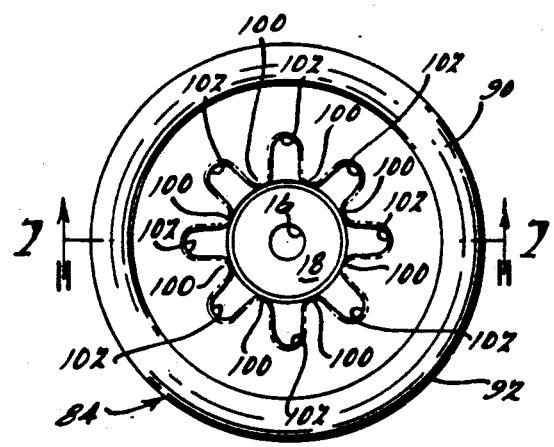
Figure 7:
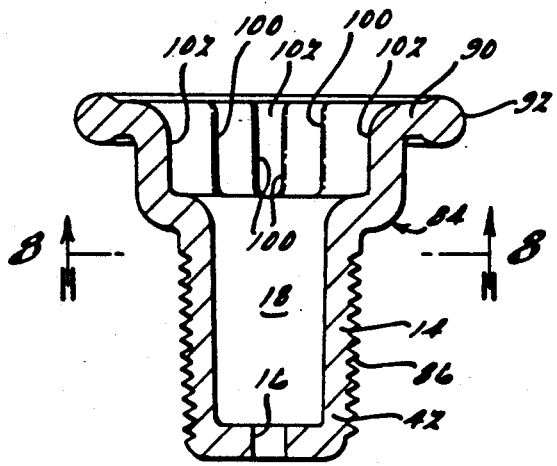

An electronic fluid pressure transducer 10 for sensing the pressure of a fluid such as engine oil is generally shown in the drawings. The transducer 10 has both sensor means which detect the pressure of the oil and circuit means to determine the actual pressure changes. As shown in the drawings, the transducer 10 includes a base portion 12 which defines an enclosure. The base member 12 is a composite with two main parts. It has a generally cup-shaped metal insert or skeletal portion 14 which has a lower hollow end portion adapted to be threadably secured to a similarly threaded aperture of an engine (not shown). The end portion has an opening 16 therethrough to admit pressurized oil into an interior 18 of the base 12. Member 14 is partially encircled or encapsulated by a molded elastomeric outer portion 20 which has wrench flats 22 formed thereby so that the transducer and the threaded portion 14 can be readily rotated relative to the threaded engine aperture.

A thin walled and generally hollow housing member 24 is supported by the base member 12 and is molded of elastomeric plastic material. The housing 24 defines an interior space 26 in which a circuit board 28 is supported. The housing 24 has an annularly shaped lower end or base portion 30, a midportion 32 which extends outwardly from and is slightly offset from the base portion 30 and a female connector type of receptacle portion 34 for receiving a connector (not shown) at the upper end of the midportion 32. As seen in FIG. 3, the base 30 of the housing 24 is received within the open upper end of the composite member 12 as defined by elastomeric portion 20 thereof.

As best understood by examining FIG. 2, the circuit board 28 has terminals 36 (only one is visible) extending from the upper edge of the board 28. When assembled as in FIG. 3, the terminals 36 project into the receptacle end portion 34. Also, the circuit board 28 has leads 38 (only one visible) extending from a lower edge of the board 28 to a sensor mounting member 40. This mounting member 40 is molded of flexible rubber-like material such as Valox 420 which is resistant to oil or the like.

Referring to FIG. 3, the mounting member 40 has a cup-shaped configuration and is supported in an inverted position. The leads 38 extend through and are molded within the mount 40. The mount 40 includes and upper end wall portion 52 and an integral side wall 54. The portions 52, 54 form an open ended interior space 56 which is communicated with the interior space 18. Specifically, the side wall 54 of mount 40 is inserted into a cylindrical recess 58 formed in portion 20. An annular channel 60 is mold formed in mount 40 and an O-ring 62 is placed therein to prevent leakage of oil between the side wall 54 and portion 20.

The mount 40 supports a generally flat electronic device or chip 64 which is secured against the underside of end wall 52 by a ring 66 of silicone sealant. As previously mentioned, the leads 38 extend through the mount 40 and are attached to the chip 64 as is well known in the electronic art. The chip 64 and sealant 66 are completely covered with a relatively thick layer 68 of nonhardening sealant gel. At the upper side or surface of the chip 64, a small opening 70 is provided through the end wall 52. A second opening 72 is provided in the base portion 30 and is aligned with the first opening to communicate the upper side of the chip 64 with atmosphere. Also, an enlarged recess 74 in portion 30 is provided to receive a small O-ring 76. The O-ring 76 bears against the chip 64 to prevent passage of any contaminants.

The upper receptacle end 34 of member 24 receives a male type electrical connector (not shown) for engaging terminals 36. Specifically, the receptacle portion 34 has a first cavity 78 to receive a typical male type connector. The connector is for connecting a wiring harness (not shown) to the circuit board 28 and the chip 64. The typical connector also includes locking means for detachably securing the connector to the housing 24. For this purpose, a second cavity 80 is defined by the receptacle portion 34 to receive the locking means. More specifically, a slot 82 in the receptacle portion 34 is provided to receive a releasable portion of the male type connector. This provides a detachable means between the connector and the receptacle.

As best understood by an examination of FIGS. 4-8, the subject transducer 10 includes base member 12. Base member 12 is a composite of elastomeric portion 20 and a skeletal metal portion 84. Portion 84 is of a generally cup-shaped configuration and includes the previously identified cylindrical end 14 with opening 16 therein. The end 14 has threads 86 formed in its cylindrical surface for mounting the transducer in the previously stated manner.

The skeletal metal member 84 is separately illustrated in FIGS. 5-8. Also, it is shown as part of the composite base 12 in FIGS. 2-4. The member 84 has an enlarged open end portion 88. The open end 88 is characterized by a radially outwardly extending portion or annularly shaped flange 90. The flange 90 has a continuous outer edge portion 92. In the preferred embodiment as illustrated, the edge 92 has a generally circular or rounded cross-section.

Figure 8:
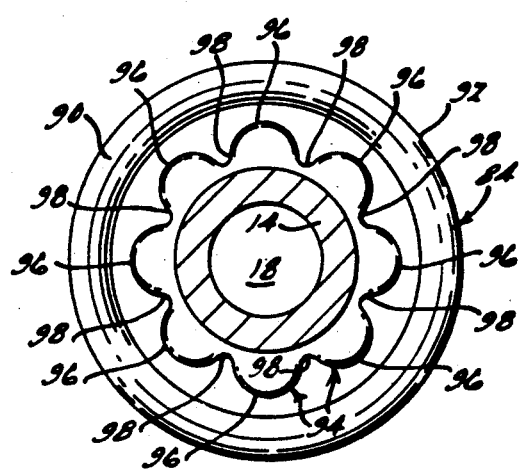

The metal member 84 has a midportion 94 between the end 14 and flange 90 which has a corrugated like formation thereabout. With reference specifically to FIG. 8, this corrugation like structure is formed by alternating ridges 96 and indentations 98 which extend radially outwardly and inwardly respectively about the midportion 94. These ridges 96 and indentations 98 are evenly spaced in the circumferential direction about the midportion 94 of the member 84. Viewed in Direction A of FIG. 5, the corrugation like structure produces alternating radially inwardly projecting walls 100 and cavities 102. Referring back to FIG. 4, the composite base member 14 is illustrated in section. The combination of metal member 84 and molded elastomeric plastic 20 is easily recognized. This composite structure has many advantages, one being a savings in weight. Another is an ease in manufacturer as well as a base which is sufficiently strong. In the molding of the portion 20, a thermosetting type elastomeric plastic material is needed. This material must be able to withstand high temperatures since temperatures experienced in a vehicle engine compartment can exceed 300 degrees F. Oil pressures may also exceed 100 psi. A particular material which has proven quite satisfactory is sold under the trade name of Cultem 2200. In use and operation, the plastic portion 20 of composite member 12 must grip the metal portion 84 very tightly since torque is applied to the portion 20 during assembly and disassembly. The molding of the plastic material in and around the ridges 96, indentations 98, walls 100 and cavities 102 provides a very substantial torque carrying connection between the parts of the composite. In addition to the above described plastic to metal structure designed for carrying torque loads, there is a critical need for a plastic to metal connection which is able to successfully resist leakage of pressurized oil between the plastic and metal since oil pressures of 100 psi or more are experienced. This sealed connection has been realized by molding a substantial thickness of plastic material about the rounded edge 92 of flange structure 90. As the hot plastic cools after injection about the metal, strong constricting forces in the radially inward direction are produced between the plastic and the metal edge. Also, similar forces are developed between the plastic and the ridges 96 and indentations 98.

Although only one embodiment of the improved composite base is described and illustrated, it is obvious that there can be modifications to the structure which still fall within the scope of the invention as defined by the following claims.

What is claimed is as follows:

1. An improved composite base for a pressure transducer used to sense the pressure of a fluid, comprising: a thin walled metal component having a generally cup-shaped configuration with a cylindrical shaped end portion, a midportion and an opposite open ended portion; means associated with the cylindrical end portion to attach the transducer to a source of pressurized fluid; the metal component including a radially outwardly projecting flange which extends about the open end creating an annularly shaped structure, the flange having a substantially continuous edge extending in the circumferential direction; an elastomeric plastic component of the base being hot molded about the metal component, a relatively thick portion of the plastic component located radially outwardly about the edge whereby as the plastic component cools subsequent to being hot molded about the edge, a substantial radially inwardly directed force is produced by the relatively thick portion of the plastic component on the edge for generating a leak resistant seal between plastic and metal.

2. The improved composite base as set forth in claim 1 in which the elastomeric plastic material is a thermosetting type.

3. The improved composite base as set forth in claim 1 in which the edge has a generally rounded configuration in cross-section.

4. The improved composite base as set forth in claim 1 in which the midportion of the metal component is configured with an irregular shape with radially inwardly and outwardly directed portions so that molding of the plastic component thereabout produces a connection therebetween able to transmit significant torque loads between the plastic component and the metal component.

5. An improved composite base for a transducer used to sense pressure of a fluid, comprising: a thin walled metal member having a generally cup-shaped configuration with a cylindrical end portion, a midportion and an open ended portion; means associate with the cylindrical end portion for connecting the base to a source of pressurized fluid; the open ended portion formed by a radially outwardly extending flange portion thus creating an annularly shaped end, the flange defining a substantially continuous edge in the circumferential direction; an elastomeric plastic member of the composite base hot molded about the midportion and open ended portion of the metal component, a relatively thick band of the plastic material encircling the edge whereby as the hot plastic cools subsequent to being molded about the edge, a strong radially inwardly directed force of plastic against metal is produced against the edge to generate a substantial sealing engagement therebetween for preventing fluid leakage between plastic and metal.

6. The improved composite base as set forth in claim 5 in which the elastomeric plastic material is a thermosetting type.

7. The improved composite base as set forth in claim 5 in which the edge has a generally rounded configuration in cross-section.

8. The improved composite base as set forth in claim 5 in which the midportion of the metal component is configured with an irregular shape with radially inwardly and outwardly directed portions so that molding of the plastic component thereabout produces a connection therebetween able to transmit significant torque loads between the plastic component and the metal component.

9. An improved composite base component for a transducer used to sense pressure of a fluid, comprising: a thin walled metal member having a generally cup-shaped configuration with a cylindrical end portion, a midportion and an open ended portion; means associated with the cylindrical end portion for connecting the base to a source of pressurized fluid; the open ended portion being formed by a radially outwardly extending flange thus creating an annularly shaped end, the flange defining a substantially continuous edge in the circumferential direction; an irregularly configured midportion characterized by alternately inwardly and outwardly directed features in the circumferential direction; an elastomeric plastic component of the composite base being hot molded about the midportion and open ended portion of the metal component, a relatively thick band of plastic material encircling the edge whereby as the hot plastic cools subsequent to molding, a strong radially inward force is developed between the plastic and the edge thereby forming a good fluid leak resistant seal; plastic material further being molded about the irregularly shaped midportion so that plastic extends between the inwardly and outwardly directed features whereby a strong mechanical connection is formed between the plastic and metal able to transmit significant torque loads between plastic and metal components.

* * * * *